(12) United States Patent
Park et al.

(10) Patent No.: US 10,859,785 B2
(45) Date of Patent: Dec. 8, 2020

(54) CAMERA MODULE AND VEHICLE

(71) Applicant: LG INNOTEK CO., LTD., Seoul (KR)

(72) Inventors: Je Kyung Park, Seoul (KR); Da Hin Moon, Seoul (KR); Chul Ho Lee, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 223 days.

(21) Appl. No.: 16/093,543

(22) PCT Filed: Apr. 13, 2017

(86) PCT No.: PCT/KR2017/004011
§ 371 (c)(1),
(2) Date: Oct. 12, 2018

(87) PCT Pub. No.: WO2017/179924
PCT Pub. Date: Oct. 19, 2017

(65) Prior Publication Data
US 2019/0121050 A1 Apr. 25, 2019

(30) Foreign Application Priority Data

Apr. 14, 2016 (KR) .................. 10-2016-0045408
Oct. 14, 2016 (KR) .................. 10-2016-0133312

(51) Int. Cl.
*G02B 7/02* (2006.01)
*B29C 65/48* (2006.01)
(Continued)

(52) U.S. Cl.
CPC .............. *G02B 7/021* (2013.01); *B29C 65/48* (2013.01); *G02B 7/02* (2013.01); *G02B 21/36* (2013.01);
(Continued)

(58) Field of Classification Search
CPC .......... G02B 7/021; G02B 7/02; G02B 21/36; H04N 5/225; H04N 5/2254; G03B 17/02; B29C 65/48
(Continued)

(56) References Cited

U.S. PATENT DOCUMENTS 8,681,220 B2 * 3/2014 Maekawa .............. H05K 9/002
348/148
9,736,347 B2 * 8/2017 Han ..................... H04N 5/2254
(Continued)

FOREIGN PATENT DOCUMENTS

| CN | 104469105 A | 3/2015 |
|----|-------------|--------|
| JP | 2007-22364 A | 2/2007 |

(Continued)

*Primary Examiner* — Mohammed A Hasan
(74) *Attorney, Agent, or Firm* — Birch, Stewart, Kolasch & Birch LLP

(57) ABSTRACT

The present embodiment provides a camera module and a vehicle comprising same, the camera module comprising: a lens barrel accommodating at least one lens; a front body accommodating the lens barrel; a substrate assembly which couples with the front body, is disposed so as to be spaced apart from the lens barrel, and comprises at least one substrate so as to have an image sensor and a connector mounted thereon; a shield can which couples with the substrate assembly so as to accommodate at least one portion of the substrate assembly; and a rear body which couples with the front body and accommodates the substrate assembly and the shield can. The shield can comprises: a hole formed in a position corresponding to the connector; and a connection member which is bent and extends towards the inside from the hole. The connector passes through the hole, and the connector has a ground part disposed on the outer surface thereof so that the ground part and the connection member electrically make contact.

20 Claims, 11 Drawing Sheets

(51) Int. Cl.
  *G02B 21/36* (2006.01)
  *H04N 5/225* (2006.01)
  *G03B 17/02* (2006.01)
(52) U.S. Cl.
  CPC ............ *G03B 17/02* (2013.01); *H04N 5/225* (2013.01); *H04N 5/2254* (2013.01)
(58) Field of Classification Search
  USPC ......................................................... 359/819
  See application file for complete search history.

(56) References Cited

U.S. PATENT DOCUMENTS

| | | |
|---|---|---|
| 2013/0265427 A1 | 10/2013 | Lin et al. |
| 2014/0320657 A1 | 10/2014 | Han et al. |
| 2018/0255213 A1* | 9/2018 | Ahn ....................... H04N 5/225 |

FOREIGN PATENT DOCUMENTS

| | | |
|---|---|---|
| JP | 3178274 U | 9/2012 |
| JP | 2014-75825 A | 4/2014 |
| KR | 10-0862104 B1 | 10/2008 |
| KR | 10-2013-0050767 A | 5/2013 |
| KR | 10-1444024 B1 | 9/2014 |

* cited by examiner

CAMERA MODULE AND VEHICLE

CROSS REFERENCE TO RELATED APPLICATIONS

This application is the National Phase of PCT International Application No. PCT/KR2017/004011, filed on Apr. 13, 2017, which claims priority under 35 U.S.C. 119(a) to Patent Application Nos. 10-2016-0045408, filed in the Republic of Korea on Apr. 14, 2016; and 10-2016-0133312, filed in the Republic of Korea on Oct. 14, 2016, all of which are hereby expressly incorporated by reference into the present application.

TECHNICAL FIELD

The teachings in accordance with exemplary and non-limiting embodiments of this invention relate generally to a camera module and a vehicle.

BACKGROUND ART

This section provides background information related to the present invention, which is not necessarily prior art.

A camera module photographing a subject in a photograph or a video may be coupled with various devices and apparatus. Particularly, vehicles coupled with a camera module have been marketed concomitant with sophistication of vehicular parts and automation. The camera modules are used by being embedded in front and rear monitoring cameras and black boxes.

An external member of vehicular camera module is generally formed by allowing a front body mounted with a lens barrel and a rear body accommodated with electronic parts to be coupled, and a metal or plastic is generally used for external member of vehicular camera module.

The metal material is expensive (about 10 times more expensive than plastic), and because a front body and a rear body are screw-connected, a screw groove is required to couple the front body and the rear body. Hence, there may be generated a problem where a space is limited for installing the electronic parts. However, there may be an advantage on the other hand in that a shield can wrapping the electronic parts is grounded to an external member to allow a residual electromagnetic radiation to be easily emitted to outside, whereby electromagnetic stability can be implemented.

In contrast, the plastic material is less expensive, and because a front body and a rear body are coupled by laser fusion, there is an advantage of broadly securing a space for accommodating parts. However, disadvantage is that the residual electromagnetic wave in shield can is difficult to be emitted to outside because of external member of non-conductive plastic material. Thus, the electromagnetic wave accumulated in the shield can may disadvantageously result in occurrences of erroneous operation due to influence affected on the electronic parts by the electromagnetic wave.

Furthermore, the recently developed super small camera modules are widely used on small electronic products such as smartphones, notebooks and garners.

Recently, the super small camera modules are used to store a running state of a vehicle in an image or a video by being installed not only on small electronic products but also on a front side of the vehicle, and widely used to improve a parking convenience by being installed on a rear side of the vehicle.

The vehicular super small cameras have a structure where a holder is coupled by a lens and a circuit substrate. In general, the holder and the circuit substrate are mutually connected by an adhesive when the holder is coupled to the circuit substrate, and an alignment process is implemented in order to match an optical axis of lens and an optical axis of image sensor when the holder and the circuit substrate are mutually coupled.

In general, in order to implement the alignment process while the holder and the circuit substrate are mutually coupled using an optical hardening adhesive hardened by light, the circuit substrate must be disposed at an outside of the holder, which is to allow the light to be provided to the optical hardening adhesive interposed between the circuit substrate and the holder.

When the circuit substrate and the holder are mutually coupled using the optical hardening adhesive, the circuit substrate has a structure of protruding toward an outside of holder, whereby various problems may be generated due to the protruded structure.

The first problem is that an entire volume of camera module may be greatly increased when the circuit substrate is protruded outside of the holder.

The second problem is that the circuit substrate may be easily separated from the holder or damaged by external impact when the circuit substrate is protruded outside of holder.

The third problem is that hermeticity may be deteriorated to allow moisture or foreign object to be easily introduced into the holder when the circuit substrate is protruded outside of holder.

These problems may be solved by arranging the circuit substrate within a concave reception part by forming the reception part on the holder. However, when the circuit substrate is disposed at the concave reception part formed at the holder, a sufficient light cannot be provided to the optical hardening adhesive formed between the holder and the reception part to greatly reduce an adhesion performance caused by non-hardening of adhesive, and as a result, there may be generated a problem of the circuit substrate being easily separated from the holder.

DETAILED DESCRIPTION OF THE INVENTION

[Technical Subject]

Exemplary embodiments of the present invention are to provide a camera module configured to arrange an external member with a plastic material to secure a wide parts accommodation space and to simultaneously implement an electromagnetic stability by being grounded to a shield can as well.

Exemplary embodiments of the present invention are to provide a camera module configured to respectively prevent the volume increase, separation or damage and moisture infiltration by arranging a PCB mounted with an image sensor in a reception part concavely formed on a holder, and to greatly improve an adhesion performance of optical hardening adhesive by implementing a sufficient hardening by providing a reflected light to an area where a light cannot be reached directly to the optical hardening adhesive because of the PCB being disposed within the reception groove part.

Furthermore, exemplary embodiments of the present invention are to provide a vehicle mounted with the above-mentioned camera module.

[Technical Solution]

A camera module according to a first exemplary embodiment is provided, comprising:

a lens barrel accommodating at least one lens;

a front body accommodating the lens barrel;

a substrate assembly which couples with the front body, is disposed so as to be spaced apart from the lens barrel, and comprises at least one substrate so as to have an image sensor and a connector mounted thereon;

a shield can which couples with the substrate assembly so as to accommodate at least one portion of the substrate assembly; and a rear body which couples with the front body and accommodates the substrate assembly and the shield can, wherein the shield can comprises: a hole formed in a position corresponding to the connector; and a connection member which is bent and extends towards the inside from the hole, and the connector passes through the hole, and the connector has a ground part disposed on the outer surface thereof so that the ground part and the connection member electrically make contact.

Preferably, but not necessarily, the ground part and the connection member may contact at a plurality of areas.

Preferably, but not necessarily, the connection member may face downwardly and may be extended to an inside of the hole to electrically contact the ground part.

Preferably, but not necessarily, the connection member may be disposed along a circumference of the hole.

Preferably, but not necessarily, the connection member may be disposed in a plural number and each of the connection members may be so disposed as to be spaced apart along a circumference of the hole.

Preferably, but not necessarily, the shield can may include a groove disposed at a distal end of the connection member at the hole, and recessed toward an outside.

Preferably, but not necessarily, each of the front body and the rear body may be formed with a plastic material.

Preferably, but not necessarily, the front body and the rear body may be formed with a plastic material mixed with a carbon or a metal.

Preferably, but not necessarily, the substrate assembly may include a first substrate and a second substrate, wherein the first substrate may be mounted with the image sensor, and the second substrate may be mounted with the connector.

A camera module according to second and third exemplary embodiments of the present invention may comprise:

a lens barrel including a lens;

a PCB (Printed Circuit Board) mounted with an image sensor incident on with a light having passed the lens;

a lens holder formed with a through hole accommodating the lens barrel and including, at a bottom surface, a reception part accommodating the PCB about the through hole; and a joint unit interposed between the PCB and the reception part to be hardened by the light, wherein the reception part includes a first reception part formed opposite to a 상기 수 lateral surface of the PCB, a second reception part formed opposite to an upper surface of the PCB, and a light optical reflection part reflecting the light introduced into the first reception part to the second reception part.

The light reflection part may be formed at a predetermined angle with the first reception part and the second reception part.

The light reflection part may include a mirror surface reflecting the light incident into the first reception part.

The light reflection part may include a first light reflection part reflecting a light incident on the first reception part at a first angle, and a second reflecting a light at a second angle by being connected to the first light reflection part.

The first angle and the second angle may be formed in a length corresponding to that of a second joint part measured from a lateral surface.

An area contacting the joint unit in the first and second reception parts may be formed with a ruggedness (凹凸) that improves an adhesive strength with the joint unit and an optical reflexibility.

The joint unit may include a UV (Ultra Violet) hardening resin hardened by the Ultraviolet rays.

An area contacting the joint unit in the PCB may be formed with a light reflection film reflecting the light.

A protrusion limiting a position of joint unit may be formed at an upper surface of PCB.

A light reflection film reflecting the light may be formed on the protrusion.

The camera module may comprise:

a lens barrel including a lens;

a lens holder formed with a through hole accommodating the lens barrel and formed at a bottom surface with a concave reception part about the through hole;

a PCB disposed at an inside of the reception part and mounted with an image sensor incident on by a light having passed the lens; and a first joint part interposed between an upper edge of the PCB and the reception part and directly hardened by being directly exposed to the incident light and a second joint part indirectly hardened by the reflected light of the light.

[Advantageous Effects]

The camera module according to an exemplary embodiment of the present invention is such that a front body and a rear body, each manufactured with plastic material, are coupled by fusion, a large number of electronic parts can be accommodated therein, and a shield can is grounded to a connector to enable an easy discharge of a residual electromagnetic wave to outside.

Furthermore, the camera module according to an exemplary embodiment of the present invention is such that a PCB mounted with an image sensor is arranged at a reception part concavely formed at a holder to respectively prevent an increased volume, separation or damage and moisture infiltration, and arrangement of PCB inside a reception groove enables providing a reflected light to an area where a light cannot be directly reached to an optical hardening adhesive to thereby prevent non-hardening, whereby an adhesive bonding performance of optical hardening adhesive can be greatly improved.

Still furthermore, the exemplary embodiment of present invention provides a vehicle mounted with the abovementioned camera module.

BEST MODE

Figure 1:
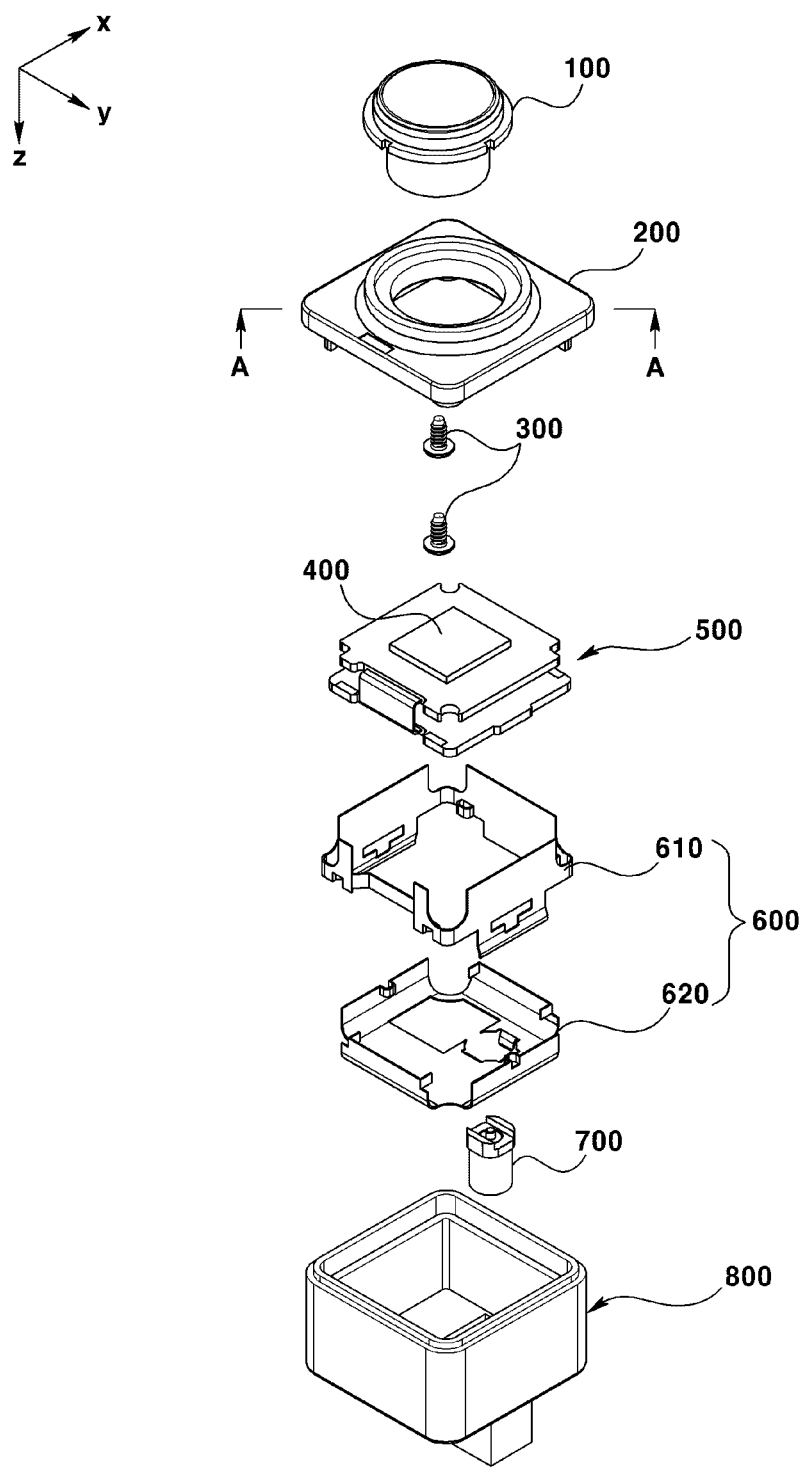
FIG. 1 is an exploded perspective view illustrating a camera module according to a first exemplary embodiment of present invention.

Some of the exemplary embodiments of the present invention will be described with the accompanying drawings. Furthermore, throughout the descriptions, the same reference numerals will be assigned to the same elements in the explanations of the figures. Detailed descriptions of well-known functions, configurations or constructions are omitted for brevity and clarity so as not to obscure the description of the present disclosure with unnecessary detail.

Furthermore, the terms "first," "second," "A", "B", (a), (b) and the like may be used herein. These terms are used to distinguish one element from another and do not limited to the substance of relevant elements, order or sequence.

It should be appreciated that, in the following description and/or claims, when the terms coupled, joined and/or connected, along with their derivatives, are used, coupled, joined and/or connected may be used to indicate that two or more elements are in direct physical contact with each other and to indicate that two or more elements are indirectly joined together via another element or intermediate elements.

Now, a vehicle (not shown, a car) mounted with a camera module according to first, second and third exemplary embodiments of the present invention will be described hereinafter.

A vehicle may include a body, doors, glasses, head lamps, tail lamps and side view mirrors.

The body may be an external member of vehicle. The body may take various types of shapes including a frame type, a monocoque type and the like. A lateral surface of body may be coupled with one or more doors. Furthermore, a front side and a rear side (an area formed with a pillar) of upper surface at the body and door may be coupled by glasses. The front side of body may be mounted with a head lamp. A rear side of body may be mounted with a tail lamp.

The head lamp may illuminate a front side of vehicle. The head lamp may be respectively available at a right side and a left side of a vehicle. The rear lamp may illuminate a rear side of vehicle. The rear lamp may be respectively available at a right side and a left side of vehicle.

A camera module according to an exemplary embodiment of present invention may be mounted on a vehicle. Thus, the camera module according to the exemplary embodiment of present invention may be called a "vehicular camera".

A lateral surface of body or at least one or more of the doors may be mounted with a camera module. That is, the camera module according to an exemplary embodiment of present invention may be installed at a front side, a rear side and a lateral side of vehicle and at more than one door.

For example, the camera module may be installed at a front side part (grille, emblem, bumper and the like) of body, a lateral part (side outer or garnish and the like) of body, and a rear part (trunk, emblem, garnish, bumper and the like) of body.

The camera module may be installed at a front side of glass coupled by a door. Thus, a side mirror (rear view mirror) of a vehicle may be replaced by a camera module according to the exemplary embodiment of present invention.

The camera module may be installed at an inside of a vehicle. In this case, the camera module may function as a black box photographing an inside of a vehicle.

An image photographed by a camera module may be electrically connected to a display part (not shown) inside the vehicle through an ECU (Electronic Control Unit). The image photographed by the camera module may be controlled by the ECU and reproduced by the display part.

The ECU may be mounted to a vehicle as one of electronic parts. However, the present invention is not limited thereto, and the ECU may be installed at an inside of the camera module. The vehicle may be formed at an inside with an inner room. A center fascia (not shown) inside of the vehicle may be installed with a display part. The display part may output the image photographed by the camera module.

Hereinafter, a camera module according to an exemplary embodiment of present invention will be described. The camera module according to an exemplary embodiment of present invention may be explained by a first exemplary embodiment, a second exemplary embodiment and a third exemplary embodiment. The first exemplary embodiment relates to a camera module capable of emitting a residual electromagnetic wave by allowing a shield can to be grounded to a connector, and the second and third exemplary embodiments relates to a camera module where a substrate is arranged at a reception part concavely formed at a holder.

Hereinafter, a camera module according to a first exemplary embodiment of present invention will be described with reference to the accompanying drawings. A "front/rear direction" may be defined as an X axis direction illustrated in the drawing. In this case, a "rear side" is an arrow direction of X axis. Furthermore, a "left/right direction" may be defined as a Y axis direction illustrated in the drawing. In this case, "right side" is an arrow direction Y axis. Furthermore, an "upper/bottom direction" is defined as a Z axis direction in the drawing. In this case, a "bottom direction" is an arrow direction of Z axis. Furthermore, an "optical axis direction" is defined as an optical axis direction of lens module (100). Meantime, the "optical direction" may be interchangeably used with "upper/bottom direction", and "Z axis direction".

Figure 2:
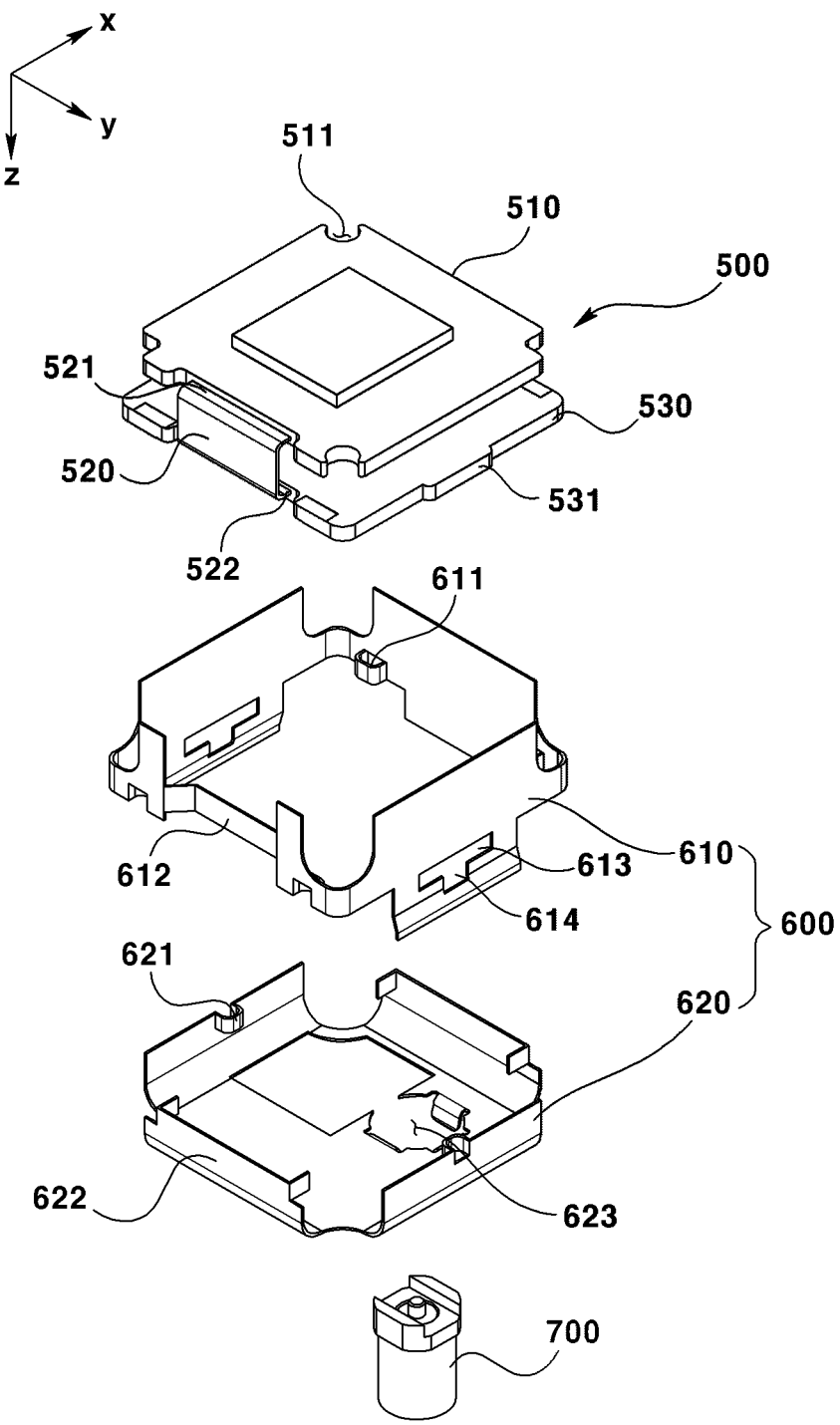
FIG. 2 is an exploded perspective view illustrating a substrate part, a shield can and a connector according to a first exemplary embodiment of present invention.
Figure 3:
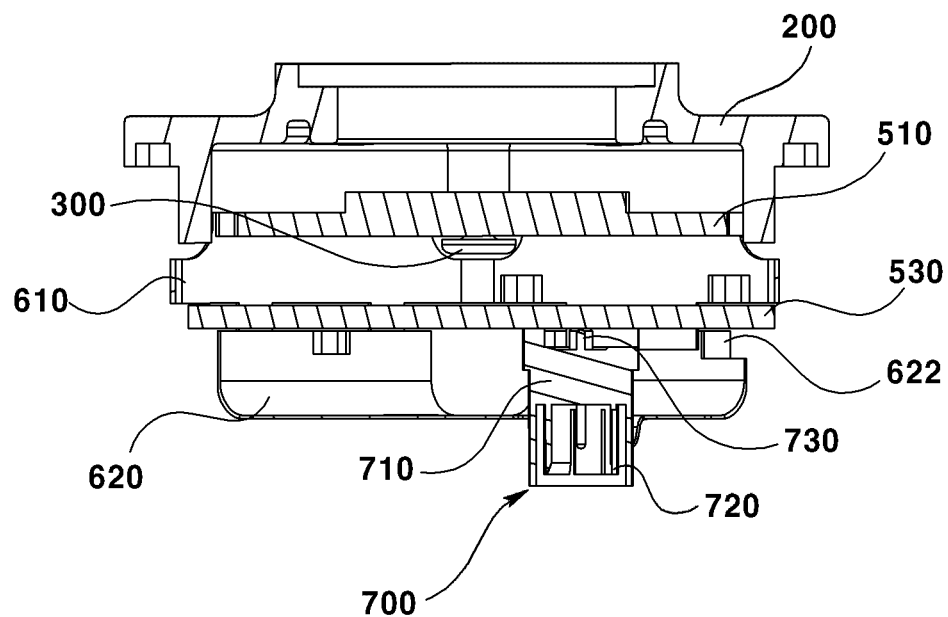
FIG. 3 is a cross-sectional view illustrating a substrate part, a shield can and a connector according to a first exemplary embodiment of present invention.
Figure 4:
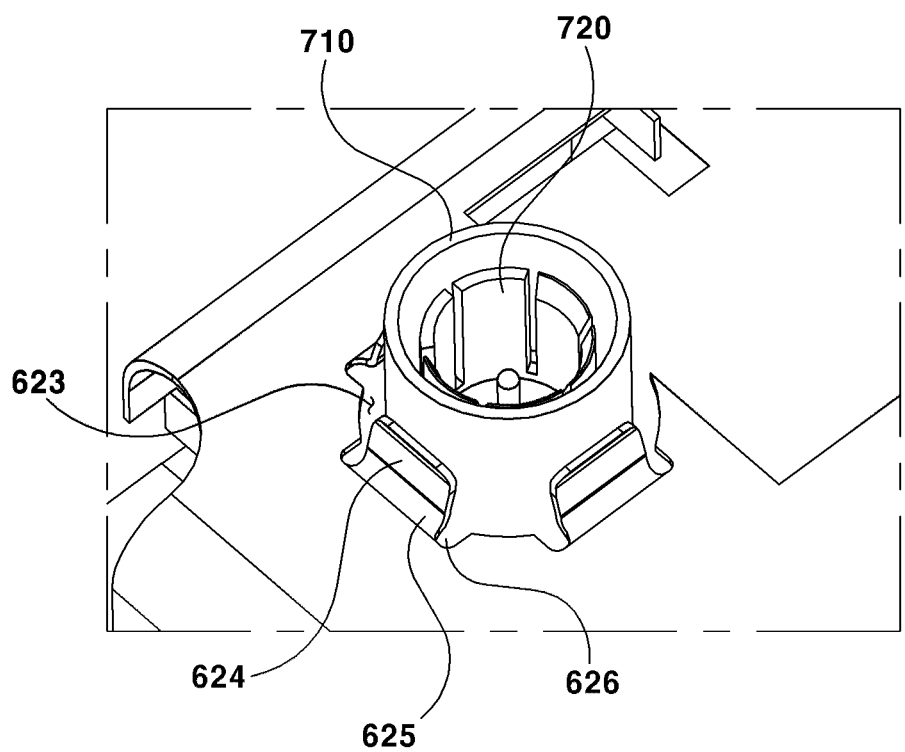
FIG. 4 is a perspective view illustrating a ground member of first exemplary embodiment being grounded to a connector.
Figure 5:
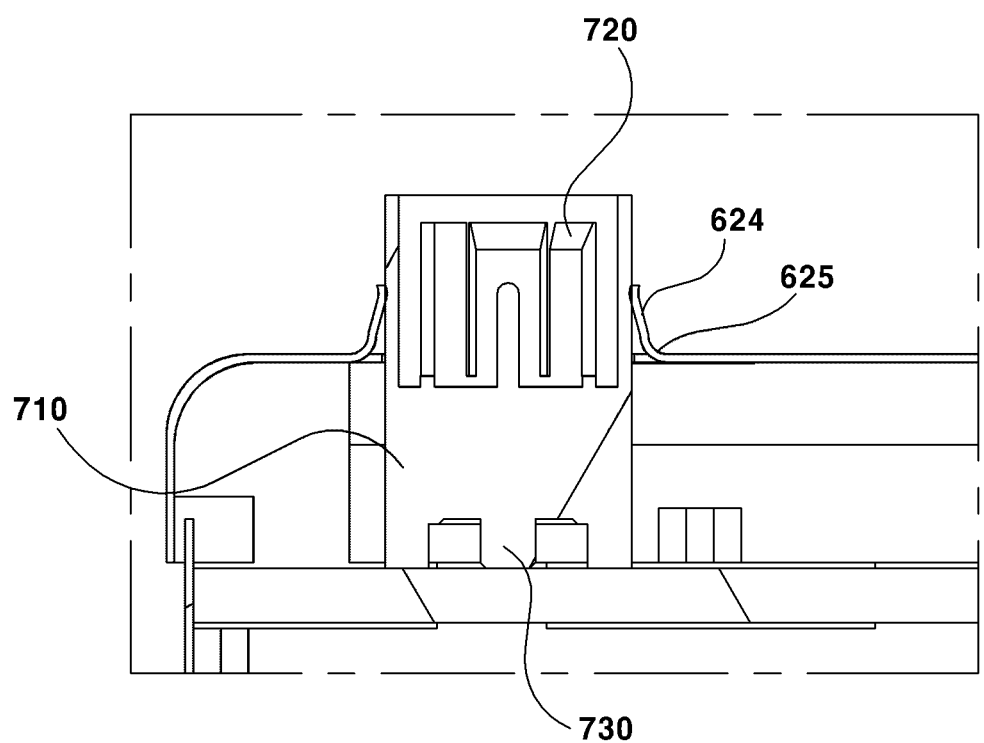
FIG. 5 is a cross-sectional view illustrating a ground member of first exemplary embodiment being grounded to a connector.

FIG. 1 is an exploded perspective view illustrating a camera module according to a first exemplary embodiment of present invention, FIG. 2 is an exploded perspective view illustrating a substrate part, a shield can and a connector according to a first exemplary embodiment of present invention, FIG. 3 is a cross-sectional view illustrating a substrate part, a shield can and a connector according to a first exemplary embodiment of present invention, FIG. 4 is a perspective view illustrating a ground member of first exemplary embodiment being grounded to a connector, and FIG.

5 is a cross-sectional view illustrating a ground member of first exemplary embodiment being grounded to a connector.

A camera module according to a first exemplary embodiment of present invention may include a lens barrel (100), a front body (200), a screw (300), an image sensor (400), a substrate assembly (500), a shield can (600), a connector (700) and a rear body (800).

The lens barrel (100) may be disposed at the front body (200, described later). The lens barrel (100) may be disposed at a bobbin of front body (200, described later). The lens barrel (100) may be accommodated into an inside of bobbin. The lens barrel (100) can accommodate one or more lenses. The lens barrel (100) may be screw-connected with a bobbin. The lens barrel (100) may be bonded to a bobbin. In this case, the lens barrel (100) may be formed at an outer circumferential surface with a flange radially extended to an outside. Furthermore, an inner circumferential surface of bobbin may be formed with a support part radially extended to an inside. Thus, a bottom surface of flange may contact and be coupled with an upper surface of support part. A light having passed the lens of the lens barrel (100) may be irradiated on an image sensor (400, described later). However, the lens barrel (100) may be omitted in a modification of the present exemplary embodiment. That is, at least one or more lenses may be directly screw-connected or coupled to a bobbin.

The front body (200) may be an external member. The front body (200) may be disposed on an upper surface of rear body (800, described later). The front body (200) may cover an opening of rear body (800). The front body (200) may be disposed with a lens barrel (100). Thus, the front body (200) may be called a "lens holder". The front body (200) may be of a plate shape formed at a center with a bobbin. As described above, the bobbin may be accommodated with the lens barrel (100).

The front body (200) may be manufactured with a plastic material. The front body (200) may be manufactured with a plastic material mixed with a carbon or a metal. The front body (200) may be manufactured with a laser-penetrable plastic material, a laser-penetrable carbon or a metal-mixed plastic material. When a plastic is added with a carbon or a metal, heat dissipation and durability may be improved. Particularly, the front body (100) may discharge the electromagnetic wave of shield can (600, described later) to an outside by being grounded with the shield can (600). However, if ratio of carbon or ratio of metal is too high, fusion or melting may not be easily realized, such that the ratio of plastic, carbon or metal must be properly traded off. The front body (200) and the rear body (800) may be coupled by being melted. In this case, the fusion may be realized by a laser fusion under a pressurized state.

A screw (300) may be a fastening member formed with screw threads. Two or more screws (300) may be present. The screw (300) may be inserted into the front body (200) through a screw groove (511) of a first substrate (510, described later). That is, the screw (300) may couple the first substrate (510) to the front body (200).

The image sensor (400) may be accommodated into an inner space of rear body (800, described later). The image sensor (400) may be mounted on a substrate assembly (500, described later). The image sensor (400) may be disposed above an upper surface of the first substrate (510) disposed at an upper surface of substrate assembly (500). The image sensor (400) may be disposed by being aligned on an optical axis of lens module (100). Thus, the image sensor (400) can obtain a light having passed the lens module (100). In this case, the image sensor (400) can convert the irradiated light to a digital signal. The image sensor (400) may be a CCD (charge coupled device), a MOS (metal oxide semi-conductor), a CPD and a CID. However, the types of image sensor (400) are not limited thereto.

The substrate assembly (500) may be accommodated into an inner space of rear body (800). The substrate assembly (500) may be disposed at an inner space of rear body (800) by being screw-coupled with the front body (200). The substrate assembly (500) may be accommodated into an inner space of rear body (800) by being wrapped by a shield can (600, described later). The substrate assembly (500) may be mounted at an upper surface with the image sensor (400). The substrate assembly (500) may be mounted at a bottom surface with a connector (700). The substrate assembly (500) may include at least one or more substrates. The substrate assembly (500) according to an exemplary embodiment of present invention may include mutually stacked, and mutually discrete first substrate (510), second substrate (530) and connection substrate (520) connecting the first substrate (510) and the second substrate (530).

The first substrate (510) may be spaced apart from the second substrate (530) to be disposed on an uppermost area of substrate assembly (500). The first substrate (510) may be connected to the second substrate (530) by the connection substrate (520). The image sensor (400) may be mounted above the first substrate (510). The first substrate (510) may be covered by the shield can (600). In this case, four sides of first substrate (510) may be brought into contact with inner lateral surfaces of shield can (600). The first substrate (510) may be supported by a first substrate support part (611) of lateral surface can (610, described later). A bottom surface of a rear area of the first substrate (510) may be supported by being in contact with the first substrate support part (611). The first substrate (510) may be fixed by being screw-coupled with the front body (200). At least a portion of corners of first substrate (510) may be formed with a screw groove (511) dug in the shape of an arc or a circle. A screw (not shown) may be inserted into the front body (200) by passing through the screw groove (511). In this case, a bottom surface near to the screw groove (511) of first substrate (510) may be brought into contact with a head of screw (300), and the screw (300) may be fixed by being partially inserted into the front body (200), whereby the first substrate (510) may be fixed by being spaced apart from the front body (200). The first substrate (510) may be a PCB (PCB, Printed Circuit Board) of square shape. The first substrate (510) can electronically control a camera module. At least a portion of four sides of first substrate (510) may be grounded with the shield can (600). Electrostatic capacity of shield can (600) may be greater than that of first substrate (510), such that a residual electromagnetic wave of first substrate (510) can be transmitted to the shield can (600).

The connection substrate (520) may connect the first substrate (510) and the second substrate (530) by being disposed between the first substrate (510) and the second substrate (530). In order to electronically control a camera module, a substrate of a predetermined area is required, but a cross-sectional area of an inner space of rear body (800) may be smaller than a cross-sectional area of the substrate according to design-wise request of vehicular camera. Thus, like the first substrate (510) and the second substrate (530) of the present invention, a plurality of substrates is generally stacked, and the connection substrate (520) is usually disposed in order to electrically connect a plurality of substrates. Meantime, the front body (200) and the rear body (800) of the present invention are coupled not by a screw but by laser fusion, such that an inner space embedded with substrate assembly (500) may be maximally provided. The connection substrate (520) may be an FPCB (Flexible Printed Circuit Board) of vertically-erected square plate shape. An upper side of the connection substrate (520) may be disposed with a curved first substrate connection part (521), and a bottom side of connection substrate (520) may be disposed with a curved second substrate connection part (522). The first substrate connection part (521) may be electrically connected to a side disposed at a front side of first substrate (510). In this case, a terminal of first substrate connection part (521) and a terminal disposed at a side disposed at a front side of first substrate (510) may be electrically connected by soldering. The second substrate connection part (522) may be electrically connected to a side disposed at a front side of second substrate (530). In this case, a terminal of second substrate connection part (522) and a terminal disposed at a side disposed at a front side of second substrate (530) may be electrically connected by soldering. The connection substrate (520) may place a connection substrate hitching part (612) of lateral surface can (610) beyond an outside (front side). Thus, an inner movement of connection substrate (520) may be restricted by a second substrate hitching part (612).

The second substrate (530) may be disposed at a lowermost area of substrate assembly (500) by being spaced apart from the first substrate (510). The second substrate (530) may be connected to the first substrate (510) by the connection substrate (520). A bottom surface of second substrate (530) may be mounted with the connector (700, described later). The second substrate (530) may be covered by the shield can (600). In this case, four sides of second substrate (530) may be brought into contact with inner sides of shield can (600).

The second substrate (530) may be fixed to a lateral surface can (610) by allowing a second substrate protruding part (531) to be inserted into a second substrate protruding groove (613) of lateral surface can (610). The second substrate protruding part (531) may take a protruding shape extended to an outside from a right side and a left side of first substrate (510). The second substrate protruding part (531) may provide a support power to the second substrate (530) by being inserted into the second substrate hitching groove (613). The second substrate (530) may be a PCB (Printed Circuit Board) of square plate shape. The second substrate (530) can electronically control a camera module. At least a portion of four sides at the second substrate (530) may be grounded to the shield can (600). Electrostatic capacity of shield can (600) may be greater than that of second substrate (530), such that a residual electromagnetic wave of second substrate (530) can be transmitted to the shield can (600).

Meantime, when the substrate assembly (500) includes only one substrate, both the image sensor and the connector may be mounted on one substrate. In this case, the image sensor may be mounted on an upper surface of substrate, and the connector may be mounted on a bottom surface of substrate.

The shield can (600) may be accommodated into an inner space of rear body (800). The shield can (600) may be disposed along a bottom surface and a lateral surface of rear body (800). In this case, an outer circumferential surface of shield can (600) may be brought into contact with an inner circumferential surface of rear body (800). The shield can (600) may be accommodated therein with the substrate assembly (500). The shield can (600) may be coupled to the substrate assembly (500) to accommodate at least a portion of substrate assembly (500).

The shield can (600) may be formed thereunder with a connector (700) passing through a bottom surface of shield can (600). The shield can (600) may take an upper-opened block shape. As a result, a light having passed the lens may be irradiated on the image sensor (400). The shield can (600) may be formed with a metal material. To be more specific, the shield can (600) may be formed with a metal plate material. In this case, the shield can (600) can shield an EMI(electromagnetic interference). That is, the shield can (600) can shield the electromagnetic wave generated from outside from entering into the substrate assembly (500). Furthermore, as discussed above, the substrate assembly (500) is grounded to the shield can (600), such that the residual electromagnetic wave remaining in the substrate assembly (500) may be accumulated in the shield can (600). However, the material of shield can (600) is not limited thereto. The shield can (600) may include a lateral surface can (610), a bottom can (620), a ground member (624) and a groove (626). The lateral surface can (610) and the bottom can (620) may be assembled. However, the lateral surface can (610) and the bottom can (620) may be integrally formed (not shown).

The lateral surface can (610) may be accommodated into an inner space of rear body (800). In this case, an outer circumferential surface of lateral surface can (610) may be brought into contact with an inner lateral surface of rear body (800). The lateral surface can (610) may be disposed at a bottom surface with a bottom can (620). The lateral surface can (610) may be accommodated therein by the substrate assembly (500). The lateral surface can (610) may take a hollowed cube shape. An upper surface and a bottom surface of lateral surface can (610) may be opened.

Therefore, the lateral surface can (610) may form a lateral surface of shield can (600). An inner surface of rear side of lateral surface can (610) may be disposed with an inwardly protruded first substrate support part (611). The first substrate support part (611) may support the first substrate (510) by being in contact with a rear portion of bottom surface of first substrate (510). A surface disposed at a front side of lateral surface can (610) may be disposed with a connection substrate hitching part (612). The connection substrate hitching part (612) may have a smaller cross-section than that of other surface at the lateral surface can (610).

That is, the connection substrate hitching part (612) may take a flat type bar shape. The connection substrate hitching part (612) may be disposed at an outside (front side) with a connection substrate (520). As a result, when the connection substrate (520) is suddenly moved to a rear side by an outside power, the connection substrate (520) can be stopped by being hitched at the connection substrate hitching part (612). The laterals surface can (610) may be formed at a left surface and a right surface with a second substrate hitching hole (613) and a bottom can hitching hole (614). The shape of second substrate hitching hole (613) may correspond to that of abovementioned second substrate protruding part (531). Thus, the second substrate protruding part (531) may be inserted into the second substrate hitching hole (613). As a result, the second substrate (530) may be fixed to the lateral surface can (610).

Meantime, a phase of second substrate hitching hole (613) may be lower than that of the first substrate support part (611), such that the second substrate (530) may be disposed at a lower surface of first substrate (510). The shape of bottom can hitching hole (614) may correspond to that of a bottom can protruding part (621, described later). As a result, the bottom can protruding part (621) may be inserted into the bottom can hitching hole (614). As a result, the bottom can (620) may be assembled to the lateral surface can (610) to be fixed to a bottom surface of lateral surface can (610). The second substrate hitching hole (613) and the bottom can hitching hole (614) may be integrally formed .

The bottom can (620) may be accommodated into an inner space of rear body (800). In this case, an outer circumferential surface of bottom can (620) may be brought into contact with an inner circumferential surface of rear body (800). The bottom can (620) may be disposed at an upper surface with the lateral surface can (610). The bottom can (620) may be disposed at a bottom surface with a connector (700) passing through a bottom surface of bottom can (620). The bottom can (620) may be formed at a bottom surface with a hole (623), and the connector (700) may be inserted into the hole (623) to be downwardly exposed. That is, the hole (623) may be formed at a position corresponding to that of the connector (700). The bottom can (620) may include a flat plate and lateral surfaces respectively extended upwardly from four sides of the flat plate. An upper surface of bottom can (620) and a vertical corner may be opened. An inwardly-extended bottom can protruding part (621) may be formed at an upper center of left/right lateral surfaces of bottom can (620). the bottom can protruding part (621) may be inserted into the bottom can hitching hole (614). As a result, a lateral surface of bottom can (620) may be fixed to the lateral surface can (610) to cover a bottom end part of lateral surface can (610). As a result, the bottom can (620) may be formed at a bottom surface of shield can (600).

The bottom can (620) may include a connection member (624) formed by bending a portion of bottom can (620). A hole (623) of bottom can (620) may be disposed with a connection member (624) grounded with the connector by being inwardly extended from the hole (623). The connection member (624) may be electrically connected to the connector (700). That is, the connection member (624) can form a ground (earth) by being electrically connected with the connector (700). The bottom can (620) and the connection member (624) may be integrally formed. The connection member (624) may be disposed around the hole (623). The connection member (624) may be formed in a plural number. The plurality of connection members (624) may be disposed by being mutually spaced apart along a surrounding of hole (623). The connection member (624) may take a shape in such a manner that a square protrusion is extended to an inside of the hole (623). An inner surface of connection member (624) may be brought into contact with an outer surface of connector (700) and grounded. The connection member (624) may form a ground (earth) by being electrically contacted with a ground part (710) of connector (700, described later). In this case, the ground part (710) may contact the connection member (624) at a plural area. The connection member (624) may be extended to an inside of hole (623) along an extended direction of connector (700). The connection member (624) may include a round part (625). The round part (625) may take a downwardly curved shape. Thus, the connection member (624) may be extended inward of the hole (623) by facing downwardly. That is, the connection member (624) may be downwardly extended to be slanted toward the connector (700) and to contact the connector (700). The residual electromagnetic wave accumulated in the shield can (600) may sequentially pass the connection member (624) and the connector (700) to be discharged to outside.

The hole (623) of bottom can (620) may be disposed with a groove (626) recessed to outside. The groove (626) may be disposed at a distal end of connection member (624). The groove (626) may be so disposed as to externally contact both distal ends of connection member (624) along the surrounding of bottom can (620). The round part (625) may be smoothly curved by the groove (626). That is, when the round part (625) is smoothly curved, stress may be concentrated on both distal ends of connection member (624). As a result, the groovd (626) may be formed at a stress-concentrated area to prevent the round part (625) from being cracked.

The hole (623), the connection member (624) and the groove (626) may be formed by etching a bottom surface of bottom can (620). In this case, when the connector (700) is inserted through the hole (623), the connection member (624) may be downwardly curved. At the same time, the connection member (624) can have a physical property of being upwardly curved by the restoring force. Thus, the connection member (624) may be supported by being slanted toward a connection (700) side. As a result, a bottom end of connection member (624) may contact the connector (700) and may be tightly fixed by the restoring force.

The connector (700) may be accommodated into an inner space of rear body (800). The connector (700) may be mounted on the substrate assembly (500). The connector (700) may be mounted at a bottom surface of second substrate (530). The connector (700) may pass through the bottom can (620) through the hole (622). The connector (700) having passed through the bottom can (620) may be accommodated into a connector reception part (850, described later) of rear body (800).

The connector (700) may include a ground part (710), a connection terminal (720) and a mounting part (730). The ground part (710) of connector (700), the connection terminal (720) and the mounting part (730) may be integrally formed. The ground part (710) may be disposed at an outside of connector (700). A bottom surface of ground part (710) is formed with a hollow hole into which the connection terminal (720) may be accommodated. An upper surface of ground part (710) may be disposed with the mounting part (730). The connection terminal (720) may be coupled with a terminal of cable (not shown). An upper surface of ground part (710) may protect the cable by wrapping an outside of cable when the cable is coupled. The mounting part (730) may be soldered to a bottom surface of second substrate (530). Thus, the connector (700) may be mounted on the second substrate (530). As a result, the second substrate (530) may be grounded with the connector (700). That is, the residual electromagnetic wave of substrate assembly (500) may be discharged to outside through the connector (700). Furthermore, as elaborated above, an outside of ground part (710) may be brought into contact with the connection member (624). As a result, the shield can (600) may be grounded to the connector (700). That is, the residual electromagnetic wave of shield can (600) may be discharged to outside through the connector (700).

The connector (700) may be electrically connected to a cable (not shown). The cable may be a conductive line connecting an electronic part with the camera module. Thus, an image signal outputted from the camera module may be transmitted to outside electronic device through the cable. Thus, an image signal photographed by the camera module may be stored by the outside electronic device, and may be displayed. Furthermore, the outside electronic device can supply an electric power to the camera module through the cable. Furthermore, the outside electronic device can send a control signal to the camera module through the cable.

The rear body (800) may be an external member. The rear body (800) may be disposed at a bottom surface of front body (200, described later). The rear body (800) may take a hollowed cubic shape upper-opened by a lateral surface that is upwardly extended from a bottom surface. The opening of rear body (800) may be covered by the front body (200). The rear body (800) may include a plastic material mixed with carbon or metal. The rear body (800) may include a laser-absorbing plastic material or a plastic material mixed with laser absorbing carbon or a metal mixed plastic material. The rear body (800) and the front body (200) may be coupled by being fused. In this case, the fusion may be realized by laser fusion under a pressurized state.

An inner space of rear body (800) may be accommodated with the substrate assembly (500) and the shield can (600). In this case, the shield can (600) may wrap the substrate assembly (500). Furthermore, the shield can (600) may be disposed along a bottom surface and a lateral surface of rear body (800). In addition, an outside of shield can (600) may be brought into contact with an inner surface of rear body (800).

A bottom surface of rear body (800) may be disposed with a connector reception part (850). The connector reception part (850) may take a hollowed cubic shape extended downwardly from a bottom surface of rear body (800). The connector reception part (850) may be accommodated with the connector (700) to be protected from outside force.

Hereinafter, characteristics of EMC (Electromagnetic compatibility) and EMI(Electromagnetic interference) according to a first exemplary embodiment of present invention will be described.

The first exemplary embodiment is characterized by the fact that the shield can (600) is grounded to the connector (700). The substrate assembly (500) may be grounded to the shield can (600) and the shield can (600) may be grounded to the connector (700).

The electromagnetic wave generated from inside of substrate assembly (500) may sequentially pass the shield can (600) and the connector (700) and discharged to outside, or may be discharged directly through the connector (700). The camera module according to the present invention was additionally provided with an electromagnetic wave discharge path sequentially passing the shield can (600) and the connector (700) from the substrate assembly (500) by allowing the shield can (600) and the connector (700) to be grounded.

The electromagnetic wave generated from outside of camera module may be accumulated on the shield can (600). The electromagnetic wave accumulated on the shield can (600) may be directly discharged through the connector (700) without passing through the substrate assembly (500). If the shield can (600) and the connector (700) are not grounded, the electromagnetic wave accumulated on the shield can (600) may be discharged by sequentially passing through the substrate assembly (500) and the connector (700). The substrate assembly (500) may be electromagnetically interfered in the process of the electromagnetic wave passing through the substrate assembly (500).

As discussed in the foregoing, the camera module according to a first exemplary embodiment of present invention can vary the ground path by grounding the shield can (700) and the connector (700), and the electromagnetic wave generated from outside of camera module can be prevented from interfering the substrate assembly (500). Thus, the characteristics of EMC (Electromagnetic compatibility) and EMI (Electromagnetic interference) according to a first exemplary embodiment of present invention was improved.

Hereinafter, the camera module according to second and third exemplary embodiments of present invention will be described with reference to accompanying drawings. A lens holder (1200) according to the second exemplary embodiment and a lens holder (1200) according to the third exemplary embodiment may correspond to the front body (200) according to the first exemplary embodiment, and a PCB (1400) according to the second and third exemplary embodiments of present invention may correspond to the first substrate (510) according to the first exemplary embodiment.

First, a camera module according to the second exemplary embodiment will be described.

Figure 6:
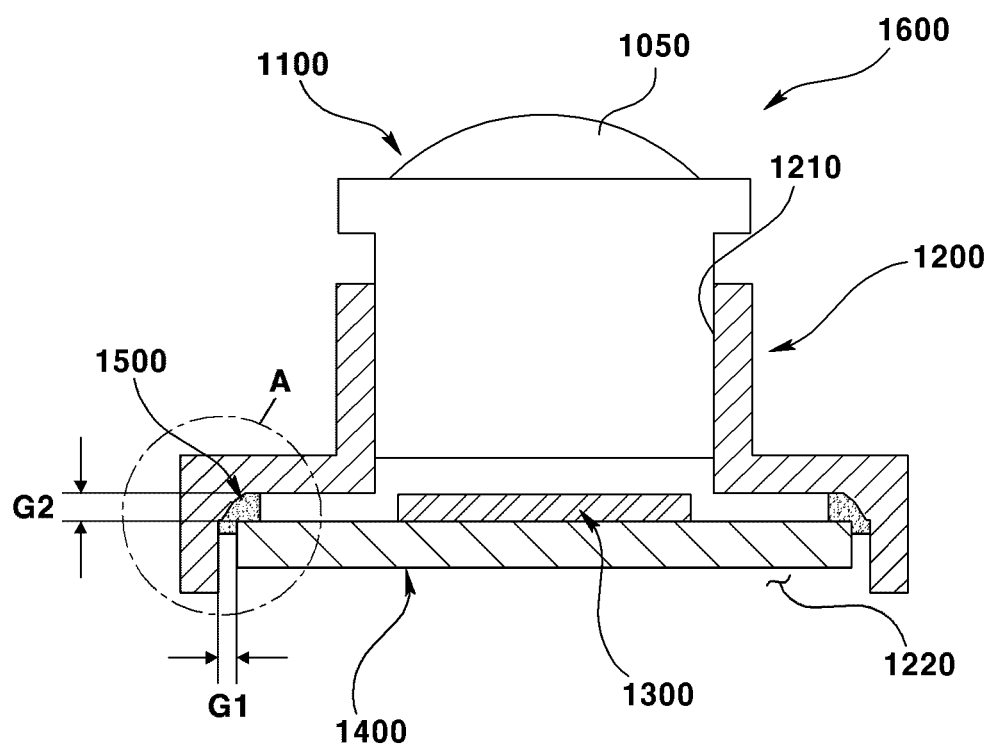
FIG. 6 is a cross-sectional view illustrating a camera module according a second exemplary embodiment of present invention.
Figure 7:
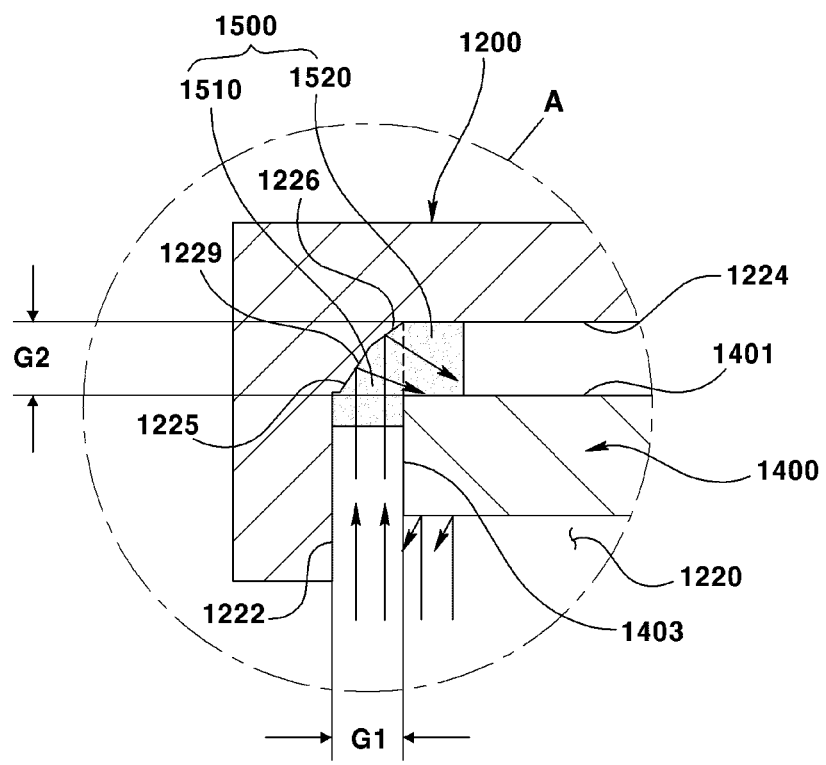
FIG. 7 is an enlarged view of 'A' part of FIG. 6.

FIG. 6 is a cross-sectional view illustrating a camera module according a second exemplary embodiment of present invention, and FIG. 7 is an enlarged view of 'A' part of FIG. 6.

Referring to FIGS. 6 and 7, a camera module (1600) may include a lens barrel (1100), a lens holder (1200), a PCB (1400) and a joint unit (1500). The lens barrel (1100) may function to receive and fix a lens (1050) providing a light to an image sensor (1300, described later).

The lens barrel (1100) may be accommodated and fixed by at least one sheet of lens (1050). The lenses accommodated into the lens barrel (1100) may be manufactured with various materials such as synthetic resin material, glass material or quartz material.

The lens holder (1200) may provide a space inserted and fixed by the lens barrel (1100) and a space accommodating the PCB (1400).

The lens holder (1200) according to the second exemplary embodiment of present invention may be called a "front body". The lens holder (1200) may be manufactured with a material having a sufficient strength to prevent from being changed in shape or damaged by an external force when the lens barrel (1100) and the PCB (1400) are coupled. That is, the lens holder (1200) may be manufactured with a metal material different from the front body (200) of the first exemplary embodiment.

The lens holder (1200) may be formed by a dye casting method using aluminum material or aluminum alloy material, for example. A surface of lens holder (1200) manufactured by the dye casting method may be formed with a protective film. The lens holder (1200) may be formed with a through hole (1210) for inserting and fixing the lens barrel (1100), a bottom surface of lens holder (1200) may be formed at a bottom surface with a concave reception part (1220) for accommodating the PCB (1400), and the reception part (1220) may communicate with the through hole (1210).

The concave reception part (1220) in the second exemplary embodiment may include a first reception part (1222), a second reception part (1224) and an optical reflection part (1229). The first reception part (1222) of reception part (1220) may be formed at an area opposite to a lateral surface (1403) of PCB (1400). The second reception part (1224) of reception part (1220) may be formed at an area opposite to an upper surface (1401) connected to the lateral surface (1403) of PCB (1400).

The first reception part (1222) in the second exemplary embodiment may be formed in parallel with the lateral surface (1403) of PCB (1400), and the second reception part (1224) may be formed in parallel with the upper surface (1401) of PCB (1400), and the first and second reception parts (1222,1224) may be mutually vertically formed.

The optical reflection part (1229) of reception part (1220) may be determined along corner areas of first and second reception parts (1222, 1224) where the first and second reception parts (1222,1224) mutually meet. Particularly, the optical reflection part (1229) may be so formed as to form a predetermined angle with the first and second reception parts (1222, 1224).

The PCB (1400) in the second exemplary embodiment may be disposed at an inside of reception part (1220). When the PCB (1400) is arranged and fixed inside of the reception part (1220) of lens holder (1200), there is an advantageous effect of more efficiently preventing an increase of entire size of camera module (1600), separation between the PCB (1400) and the lens holder (1200) and intrusion of moisture or foreign object into the lens holder (1200).

The PCB (1400) in the second exemplary embodiment may be formed in a shape and a size adequate for insertion into the reception part (1220). The PCB (1400) in the second exemplary embodiment may include an upper surface (1401) and a lateral surface (1403) connected to the upper surface (1401).

An area corresponding to the through hole (1210) on the upper surface (1401) of PCB (1400) may be mounted with an image sensor (1300) converting an outside light having passed the lens (150) of lens barrel (1100) to a digital image. In the second exemplary embodiment, a first gap (G1) may be formed between the lateral surface (1403) of PCB (1400) and the first reception part (1222), and a second gap (G2) may be formed between the upper surface (1401) of PCB (1400) and the second reception part (1224) of lens holder (1200).

Meantime, the PCB (1400) may be fixed to the lens holder (1200) at an inside of the reception part (1220) by the joint unit (1500). The joint unit (1500) functioning to fix the PCB (1400) to an inside of the reception part (1220) in the second exemplary embodiment may include an optically hardening adhesive hardened and joined by a light such as UV, for example.

The optically hardening adhesive may have a physical property of being hardened when a light is provided and having liquidity when no light is provided. The optically hardening adhesive in the second exemplary embodiment may include an optically hardened epoxy resin that is hardened by a light such as UV.

The joint unit (1500) fixing the PCB to an inside of reception part (1220) in the second exemplary embodiment may be divided to two parts by the position of PCB (1400). The joint unit (1500) may be divided to a first joint part (15100 and a second joint part (1520) by the position of PCB (1400).

Figure 8:
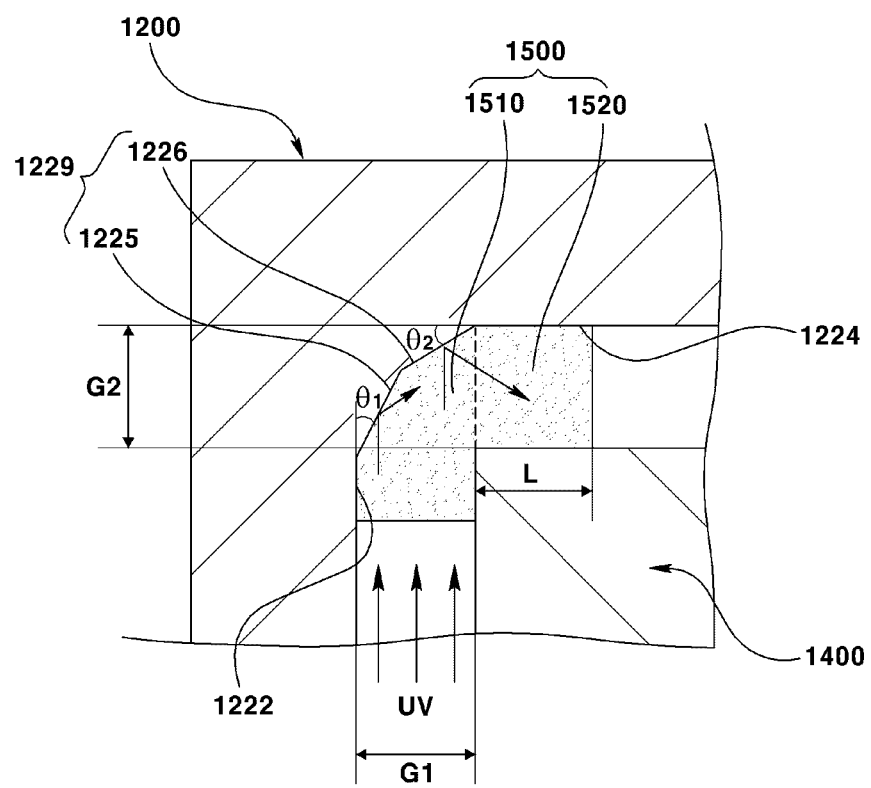
FIG. 8 is an enlarged view illustrating a light reflection part of FIG. 7 and a joint unit.

FIG. 8 is an enlarged view illustrating a light reflection part of FIG. 7 and a joint unit.

Referring to FIGS. 7 and 8, the first joint part (1510) may be formed at a position corresponding to that of the first gap 9G1) in the joint unit (1500), and the second joint part (1520) may be formed at a position corresponding to that of the second gap (G2) in the joint unit (1500). The first joint part (1510) in the second exemplary embodiment may be formed by being hardened by a light such as UV provided from outside through the first gap (G1).

Meanwhile, the second joint part (1520) may not be directly provided with a light such as UV because of being covered by the PCB (1400), but may be formed by being hardened by a light provided to the second gap (G2) after passing through the first gap (G1).

In order to form the second joint part (1520) on the second gap (G2), a structure for reflecting a light having passed the first gap (G1) is required, and in order to form a second joint part (1520) on the second gap (G2), an area where the first reception part (1222) and the second reception part (1224) of lens holder (1200) may be formed with an optical reflection part (1229). The optical reflection part (1229) may reflect or provide a light such as UV having been introduced through the first gap (G1) to an inside of the second gap (G2).

The optical reflection part (1229) in the second exemplary embodiment may include a first optical reflection part (1225) and a second optical reflection part (1226).

The first optical reflection part (1225) and the second optical reflection part (1226) may have a mutually connected structure. The first optical reflection part (1225) may be formed at a first angle (θ1) relative to the first reception part (1222), where the first angle (θ1) may be an acute angle, for example. The second optical reflection part (1226) may be formed at a second angle (θ2) relative to the second reception part (1224), where the second angle (θ2) may be an acute angle, for example.

The first angle (θ1) and the second angle (θ2) in the first and second optical reflection parts (1225, 1226) may be same or mutually different, and an angle between the first and second optical reflection parts (1225, 1226) may be an obtuse angle.

All of the first and second optical reflection parts (1225, 1226) in the second exemplary embodiment may be formed with a mirror surface capable of reflecting a light. The first angle (θ1) of first optical reflection part (1225) and the second angle (θ2) of second optical reflection part (1226) may be formed in response to a length (L) of second joint part (1520) formed inside the second gap (G2).

Figure 9:
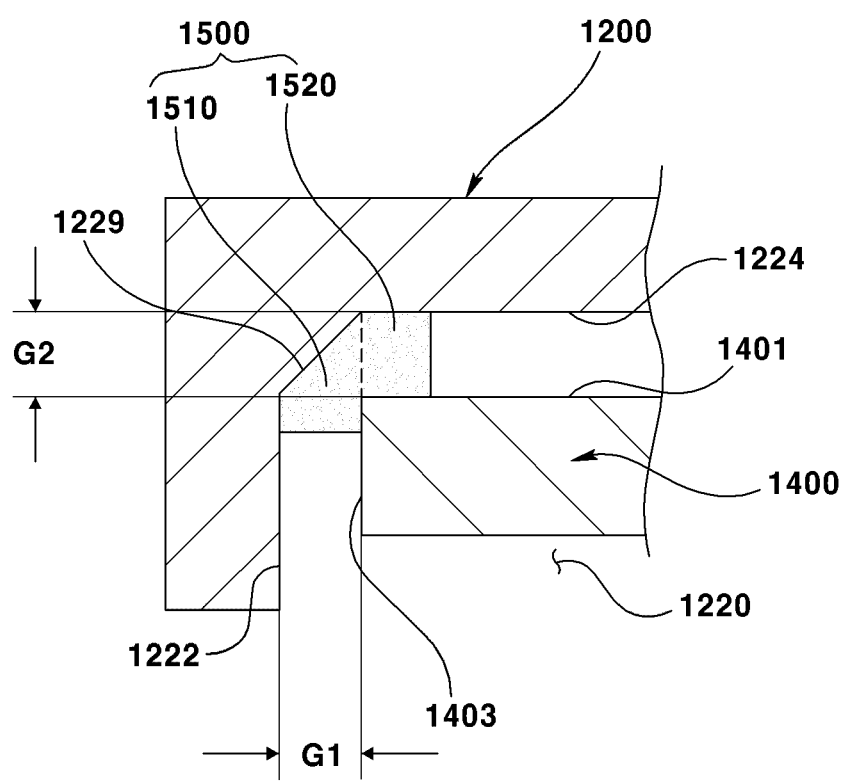
FIG. 9 is a cross-sectional view illustrating a light reflection part according to third exemplary embodiment of present invention.

Meantime, although the optical reflection part (1229) in the second exemplary embodiment may include the first optical reflection part (1225) and the second optical reflection part (1226) in order to reflect the light, the optical reflection part (1229) may be formed with a single mirror as illustrated in FIG. 9.

Hereinafter, a camera module according to a third exemplary embodiment will be described.

Figure 10:
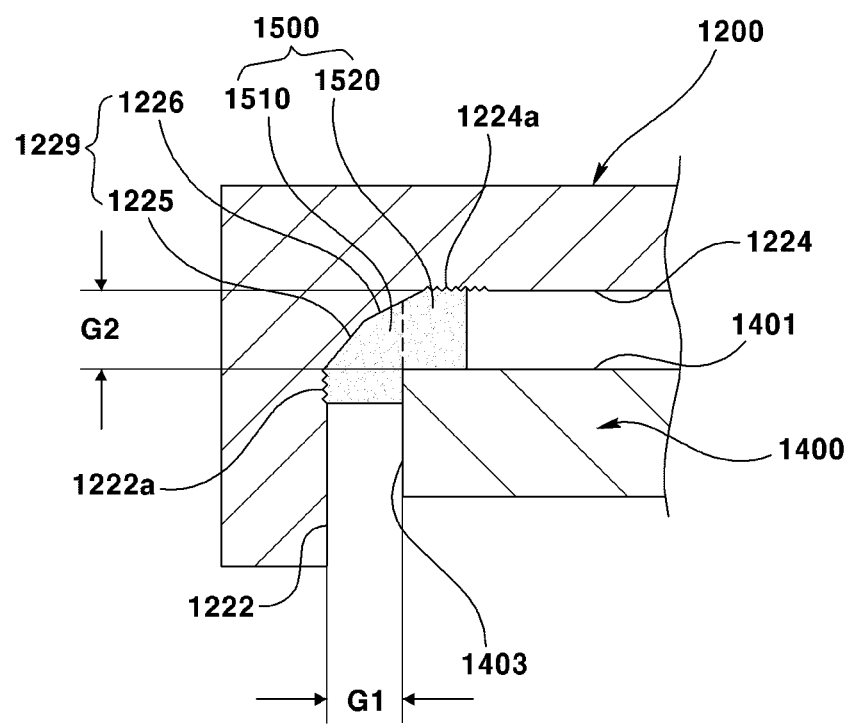
FIG. 10 is a cross-sectional view illustrating a lens holder and a joint unit according to third exemplary embodiment of present invention.

FIG. 10 is a cross-sectional view illustrating a lens holder and a joint unit according to third exemplary embodiment of present invention.

Referring to FIG. 10, when the first optical reflection part (1225) and the second optical reflection part (1226) of the optical reflection part (1229) are formed with a smooth mirror surface in order to form the joint unit (1500) fixing the PCB (1400) to an inside of the reception part (1220) of lens holder (1200), an attached area may be reduced to allow the joint unit (1500) to be arbitrarily separated from the lens holder (1200) by an external shock and a vibration applied from outside.

In order to prevent this occurrence, a first ruggedness (凹凸, 1222a) artificially increasing a joined area may be formed on the first reception part (1222) adjacent to the first optical reflection part (1225) and contacted with the first joint part (1510) according to the third exemplary embodiment.

Furthermore, a second ruggedness (凹凸, 1224a) may be artificially formed on the second reception part (1224) adjacent to the second optical reflection part (1226) and contacted with the second joint part (1520).

Meantime, although the third exemplary embodiment has illustrated and explained that the first and second reception parts (1222, 1224) are respectively formed with first and second ruggedness (1222a, 1224a), a ruggedness may be additionally formed on the PCB (1400) contacting the first and second joint parts (1510,1520) to enhance the adhesiveness of the joint unit (1500) and the PCB (1400).

Figure 11:
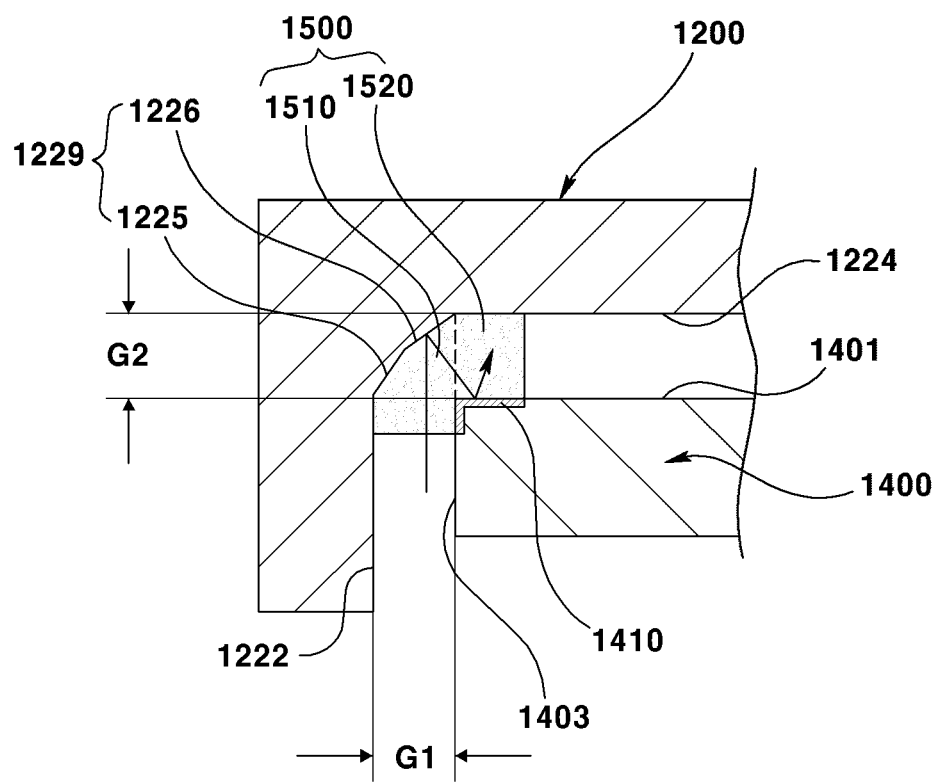
FIG. 11 is a cross-sectional view illustrating a lens holder and a joint unit according to a third exemplary embodiment of present invention.

FIG. 11 is a cross-sectional view illustrating a lens holder and a joint unit according to a third exemplary embodiment of present invention.

Referring to FIG. 11, an optical reflection film (1410) for severally reflecting a light provided through the first gap (G1) may be formed on an edge of upper surface (1401) of PCB (1400) and an edge of lateral surface (1403) of PCB (1400) contacting the joint unit (1500).

When the optical reflection film (1410) is formed respectively on the edge of upper surface (1401) of PCB (1400) and the edge of lateral surface (1403), a light introduced into the second gap (G2) through the first gap (G1) can be reflected at least more than once from an inside of the second gap (G2), whereby non-hardening of optical(ly) hardening adhesive caused by lack of light at the second joint part (1520) formed at the second gap (G2) can be prevented.

Although the third exemplary embodiment has illustrated and explained that the optical reflection film (1410) is formed respectively on the edge of upper surface (1401) of PCB (1400) and the edge of lateral surface (1403), alternatively, a mirror surface or an optical reflection film may be formed on the first reception part (1222) of the lens holder (1200) and the second reception part (1224).

Figure 12:
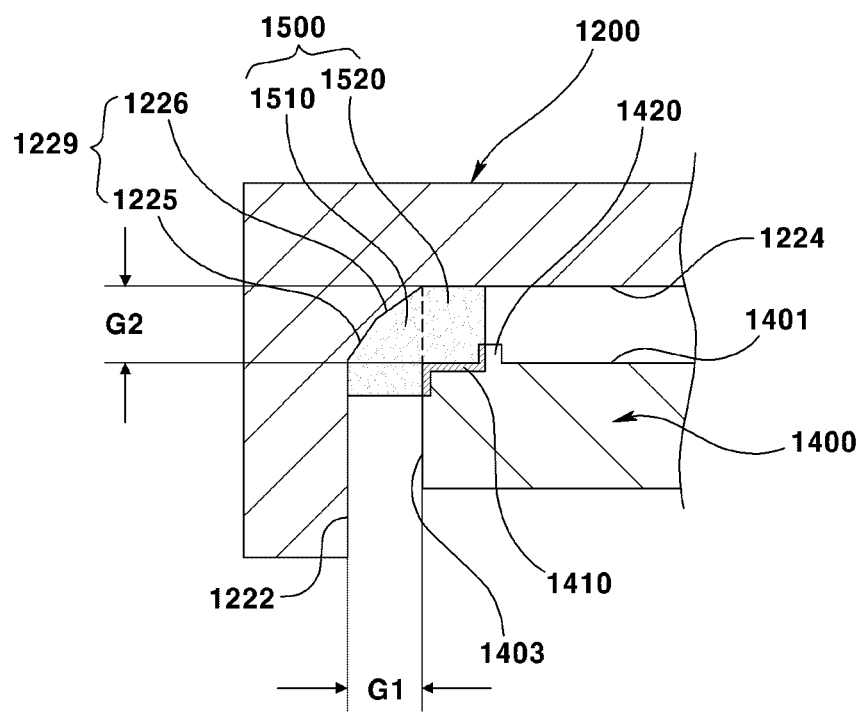
FIG. 12 is a cross-sectional view illustrating a lens holder and a joint unit according to a third exemplary embodiment of present invention.

FIG. 12 is a cross-sectional view illustrating a lens holder and a joint unit according to a third exemplary embodiment of present invention.

Referring to FIG. 12, the optically hardening adhesive provided to the second gap (G2) formed between the upper surface (1401) of PCB (1400) and the first reception part (1222) has liquidity before being hardened, and therefore, can move inside the second gap (G2).

In order to prevent the optically hardening adhesive from moving inside the second gap (G2) before being hardened by the light, the PCB (1400) may be formed with a protrusion (1420), and the position of protrusion (1420) may be an area corresponding to a distal end of the second joint part (1520). A lateral wall of the protrusion (1420) in the third exemplary embodiment is formed with an optical reflection film to thereby prevent the optically hardening adhesive from being un-hardened.

Although the third exemplary embodiment has illustrated and explained that the protrusion (1420) is formed on an upper surface (1401) of PCB (1400), alternatively, a protrusion protrusively formed in a rib shape from the first reception part (1222) to prevent the optically hardening adhesive from moving or flowing before the optically hardening adhesive is hardened.

As explained in detail from the foregoing elaboration, a PCB mounted with an image sensor is arranged at a reception part concavely formed at a holder to respectively prevent an increased volume, separation or damage and moisture infiltration, and arrangement of PCB inside a reception groove enables providing a reflected light to an area where a light cannot be directly reached to an optical hardening adhesive to thereby prevent non-hardening, whereby an adhesive bonding performance of optical hardening adhesive can be greatly improved.

Although the present invention has been explained with all constituent elements forming the exemplary embodiments of the present invention being combined in one embodiment, or being operated in one embodiment, the present invention is not always limited thereto. That is, one or more of all the elements may be selectively coupled and operated within an object scope of the present invention.

Terms "includes", "comprises" or "have" as used herein mean the presence of relevant elements unless particularly otherwise defined, such that it should be appreciated that other elements may not be excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The foregoing explanation is intended to merely exemplify the technical ideas of the present invention, and therefore, it should be understood that numerous other modifications and amendments can be devised by those skilled in the art unless deviated from the intrinsic characteristics of the present invention. Thus, the exemplary embodiments disclosed in the present invention do not limit but explain the technical ideas of the present invention, and the scope of technical ideas of the present invention is not limited by the given exemplary embodiments. The scope of present invention may be interpreted by the following claims and all the technical ideas within the equivalent scope may be interpreted as including the right scope of the present invention.

The invention claimed is:

1. A camera module, comprising:
a lens barrel accommodating at least one lens;
a front body accommodating the lens barrel;
a substrate assembly which couples with the front body, is disposed so as to be spaced apart from the lens barrel, and comprises at least one substrate so as to have an image sensor and a connector mounted thereon;
a shield can which couples with the substrate assembly so as to accommodate at least one portion of the substrate assembly; and
a rear body which couples with the front body and accommodates the substrate assembly and the shield can,
wherein the shield can comprises a hole formed in a position corresponding to the connector, and a connection member which is bent and extends towards the inside from the hole, and
wherein the connector passes through the hole, and the connector has a ground part disposed on the outer surface thereof so that the ground part and the connection member electrically make contact.

2. The camera module of claim 1, wherein the ground part and the connection member contact at a plurality of areas.

3. The camera module of claim 1, wherein the connection member faces downwardly and is extended to an inside of the hole to electrically contact the ground part.

4. The camera module of claim 1, wherein the connection member is disposed along a circumference of the hole.

5. The camera module of claim 1, wherein the connection member is disposed in a plural number and each of the connection members is so disposed as to be spaced apart along a circumference of the hole.

6. The camera module of claim 1, wherein the shield can includes a groove disposed at a distal end of the connection member at the hole, and recessed toward an outside.

7. The camera module of claim 1, wherein the front body and the rear body is formed with a plastic material.

8. The camera module of claim 7, wherein the front body and the rear body are formed with a plastic material mixed with a carbon or a metal.

9. The camera module of claim 1, wherein the substrate assembly includes a first substrate and a second substrate, and wherein the first substrate is mounted with the image sensor, and the second substrate is mounted with the connector.

10. The camera module of claim 9, wherein the substrate assembly comprises connection substrate connecting electrically the first substrate and the second substrate.

11. The camera module of claim 9, wherein the connector comprises a connection terminal and a mounting part disposed on an upper portion of the ground part, wherein the mounting part is disposed on a bottom surface of the second substrate.

12. The camera module of claim 11, wherein the mounting part is electrically connected with the bottom surface of the second substrate by soldering.

13. The camera module of claim 1, wherein the shield can comprises a lateral surface can and a bottom can disposed below the lateral surface can, and
wherein the hole and the connection member are disposed on the bottom can.

14. The camera module of claim 13, wherein the lateral surface can contacted with an inner surface of the rear body.

15. The camera module of claim 1, wherein the connection member comprises a round part formed curved downwarldly.

16. The camera module of claim 1, wherein an outer surface of the ground part contacts with the connection member.

17. The camera module of claim 1, wherein an electromagnetic generated from inside of the substrate assembly sequentially passes the shield can and the connector and is discharged to outside of the camera module.

18. The camera module of claim 1, wherein an electromagnetic generated from outside of the camera module is accumulated on the shield can and is directly discharged to outside of the camera module through the connector without passing through the substrate assembly.

19. The camera module of claim 1, wherein a diameter of the hole is greater than a diameter of the connector.

20. A vehicle, comprising:
a body;
one or more doors installed on the body;
a display part disposed at an inside of the body; and
a camera module disposed at least on the body or one or more doors, and electrically connected to the display part; wherein the camera module comprises:
a lens barrel accommodating at least one lens;
a front body accommodating the lens barrel;
a substrate assembly which couples with the front body, is disposed so as to be spaced apart from the lens barrel, and comprises at least one substrate so as to have an image sensor and a connector mounted thereon;
a shield can which couples with the substrate assembly so as to accommodate at least one portion of the substrate assembly; and
a rear body which couples with the front body and accommodates the substrate assembly and the shield can,
wherein the shield can comprises a hole formed in a position corresponding to the connector, and a connection member which is bent and extends towards the inside from the hole, and
wherein the connector passes through the hole, and the connector has a ground part disposed on the outer surface thereof so that the ground part and the connection member electrically make contact.

* * * * *